US008165138B2

(12) United States Patent
Brown et al.

(10) Patent No.: US 8,165,138 B2
(45) Date of Patent: *Apr. 24, 2012

(54) CONVERGED INFINIBAND OVER ETHERNET NETWORK

(75) Inventors: Aaron C. Brown, Austin, TX (US);
Jimmy R. Hill, Austin, TX (US);
Gregory F. Pfister, Austin, TX (US);
Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/950,055

(22) Filed: Dec. 4, 2007

(65) Prior Publication Data

US 2009/0141734 A1    Jun. 4, 2009

(51) Int. Cl.
*H04L 12/28* (2006.01)
*H04L 12/56* (2006.01)

(52) U.S. Cl. ........................................... 370/401
(58) Field of Classification Search .................. 370/466, 370/467; 709/249
See application file for complete search history.

(56) References Cited

U.S. PATENT DOCUMENTS

| 7,564,869 | B2 * | 7/2009 | Cafiero et al. | 370/466 |
| 2004/0213220 | A1 * | 10/2004 | Davis | 370/389 |
| 2006/0130052 | A1 * | 6/2006 | Allen et al. | 717/172 |
| 2008/0025322 | A1 * | 1/2008 | Tadimeti et al. | 370/400 |
| 2008/0159260 | A1 * | 7/2008 | Vobbilisetty et al. | 370/351 |

OTHER PUBLICATIONS

Obsidian (Business Wire, "Nasa Joins with Obsidian to Demonstrate AES Infiniband Encryption over 10Gigabit Ethernet at Full-Line Rate", Published Nov. 7, 2007).*

* cited by examiner

*Primary Examiner* — Ayaz Sheikh
*Assistant Examiner* — Tarell Hampton
(74) *Attorney, Agent, or Firm* — Yudell Isidore Ng Russell PLLC

(57) ABSTRACT

A method of providing a converged InfiniBand over Ethernet (IBOE) network. An IBOE switch receives a data packet. If the data packet is received by the IBOE switch from the InfiniBand network, a translation utility looks up an Ethernet media access control (MAC) address corresponding to an LID of the packet in a translation table. The translation utility generates an Ethernet packet and encapsulates an InfiniBand link layer packet before sending the packet. If the data packet is received by the IBOE switch from the Ethernet network, the translation utility removes the Ethernet header from the packet and looks up a LID corresponding to the MAC address. The translation utility calculates an outbound port number and sends the packet.

6 Claims, 3 Drawing Sheets

|  | InfiniBand LID 1 | InfiniBand LID 2 | ... | InfiniBand LID M |
|---|---|---|---|---|
| MAC Address 1 | IBOE Port Number 1 | 0 | 0 | 0 |
| MAC Address 2 | 0 | 0 | 0 | IBOE Port Number 2 |
| ⋮ | 0 | 0 | IBOE Port Number | 0 |
| MAC Address M | 0 | IBOE Port Number X | 0 | 0 |

FIG. 2A

| MAC Address 1 | InfiniBand LID 1 | IBOE Port Number 1 |
|---|---|---|
| MAC Address 2 | InfiniBand LID 2 | IBOE Port Number 2 |
| ⋮ | ⋮ | ⋮ |
| MAC Address M | InfiniBand LID M | IBOE Port Number X |

FIG. 2B

CONVERGED INFINIBAND OVER ETHERNET NETWORK

BACKGROUND OF THE INVENTION

1. Technical Field

The present invention relates in general to computer networks and in particular to computer networking protocols. Still more particularly, the present invention relates to an improved method and system for a converged InfiniBand over Ethernet network.

2. Description of the Related Art

InfiniBand is a switched fabric computer network communications link that includes connections between multiple processor nodes and high performance Input/Output (I/O) nodes. InfiniBand provides a point-to-point bidirectional serial link between processors and high performance peripheral devices (e.g., data storage units). The InfiniBand protocol supports several signaling rates, but does not include a standard programming interface.

Ethernet is a family of frame-based computer networking technologies that operates at multiple signaling rates. Ethernet is typically used in Local Area Networks (LANs). The Ethernet protocol, which is also referred to as the Institute of Electrical and Electronics Engineers (IEEE) 802.3 standard, defines wiring and signaling standards for physical LAN layers, including a means of network access at the Media Access Control (MAC) sub layer and a common address format. Ethernet stations communicate by sending small blocks of data, referred to as data packets, between nodes and/or infrastructure devices (e.g., hubs, switches, and routers) over various types of copper twisted pair wiring and/or fiber optic cable. Each Ethernet station includes a single 48-bit MAC address that may be used to specify the destination or source of a data packet.

Conventional heterogeneous server and storage networks support multiple network protocols simultaneously, such as Ethernet and InfiniBand. As the number of protocols supported by a heterogeneous network increases, so does the complexity of the network infrastructure. For example, heterogeneous server and storage networks include multiple types of adapters and cables in order to communicate with all available network devices. A heterogeneous network also typically uses a different fabric manager for each protocol type that the network supports.

SUMMARY OF AN EMBODIMENT

Disclosed are a method, system, and computer program product for a converged InfiniBand over Ethernet (IBOE) network. An IBOE switch receives a data packet. If the data packet is received by the IBOE switch from the InfiniBand network, a translation utility looks up an Ethernet media access control (MAC) address corresponding to an LID of the packet in a translation table. The translation utility generates an Ethernet packet and encapsulates an InfiniBand link layer packet before sending the packet. If the data packet is received by the IBOE switch from the Ethernet network, the translation utility removes the Ethernet header from the packet and looks up a LID corresponding to the MAC address. The translation utility calculates an outbound port number and sends the packet.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2A illustrates an InfiniBand over Ethernet translation table, according to a first embodiment of the present invention;

FIG. 2B illustrates an InfiniBand over Ethernet translation table, according to a second embodiment of the present invention.

DETAILED DESCRIPTION OF AN ILLUSTRATIVE EMBODIMENT

The present invention provides a method, system, and computer program product for a converged InfiniBand over Ethernet (IBOE) network.

Figure 1:
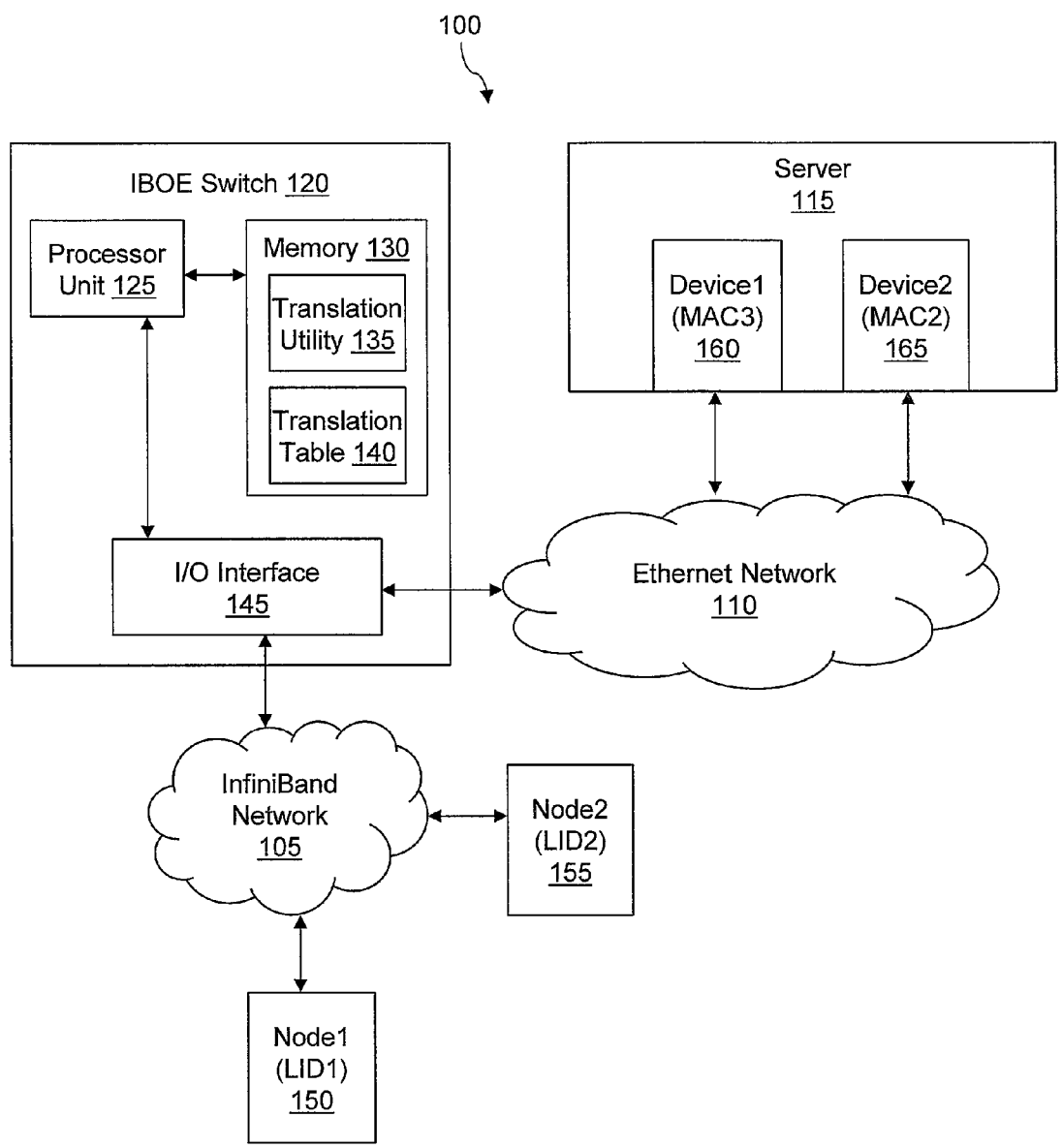
FIG. 1 depicts a high level block diagram of an exemplary network, according to an embodiment of the present invention.

With reference now to FIG. 1, there is depicted a high level block diagram of an exemplary network, according to an embodiment of the present invention. As shown, network 100 includes InfiniBand network 105, Ethernet network 110, and server 115. According to the illustrative embodiment, server 115 is coupled to Ethernet network 110 through Ethernet device1 160 and device2 165. Network 100 also includes IBOE switch 120, which enables Ethernet device1 160 and device2 165B in server 115 to communicate with InfiniBand network 105 via Ethernet network 110. InfiniBand node1 150 and node2 155, which correspond to the addresses Local Identifier 1 (LID1) and LID2 on the InfiniBand network 105. Similarly, Ethernet device1 160 and device2 165, correspond to the addresses Ethernet Media Access Control 1 (MAC1), and MAC2, on the Ethernet fabric 110. Although FIG. 1 depicts 2 InfiniBand nodes and 2 Ethernet MAC devices, network 100 may include a different number of InfiniBand nodes and/or Ethernet devices.

Figure 3:
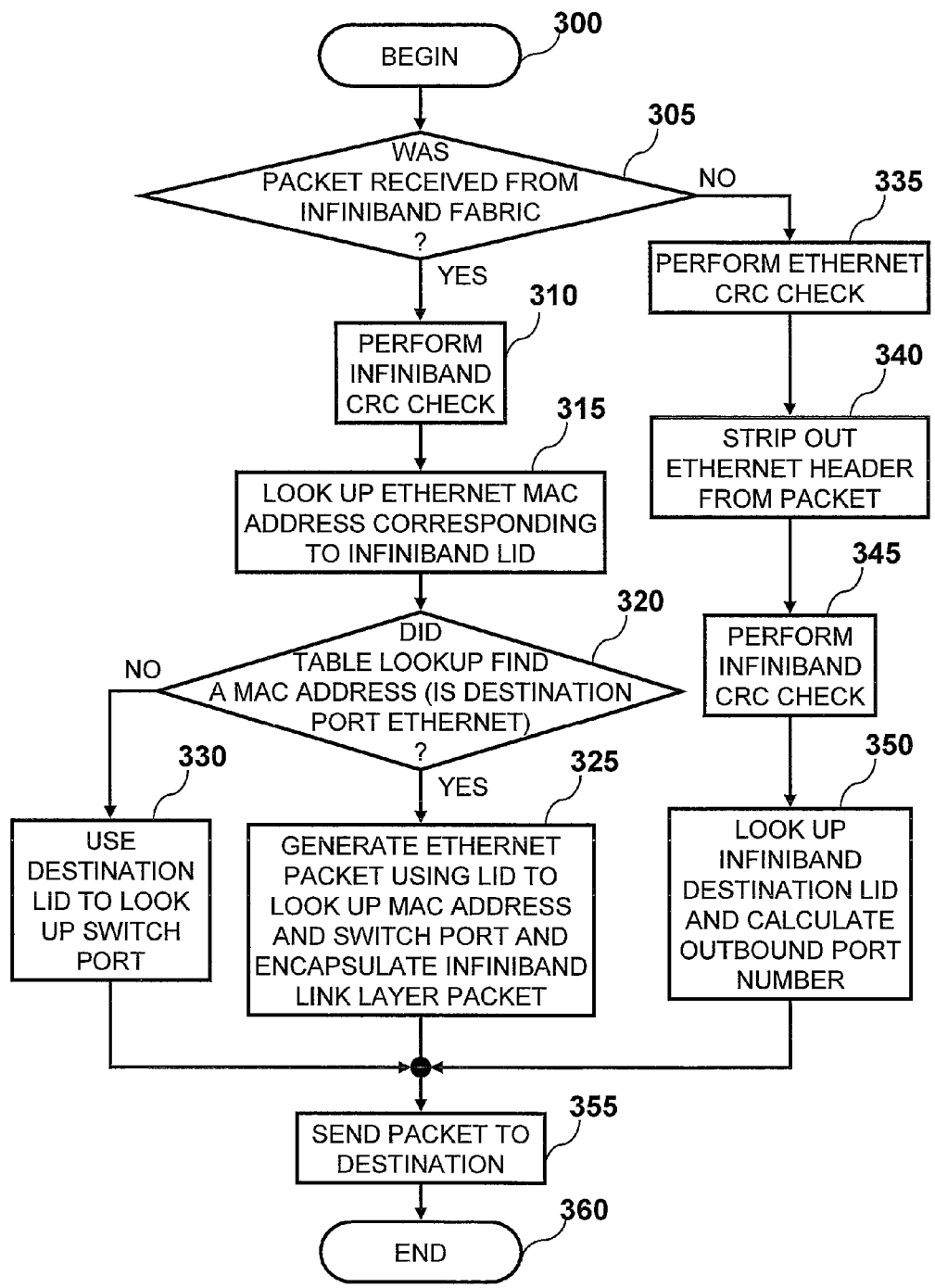
FIG. 3 is a high level logical flowchart of an exemplary method of providing a converged InfiniBand over Ethernet network, according to an embodiment of the invention.

According to the illustrative embodiment, IBOE switch 120 includes processor unit 125, memory 130, and input/output (I/O) interface 145. Processor unit 125 is coupled to I/O interface 145, which is coupled to both InfiniBand network 105 and Ethernet network 110. Processor unit 125 is also coupled to memory 130. Memory 130 may be a lowest level of volatile memory in IBOE switch 120. This volatile memory may include additional higher levels of volatile memory (not shown), including, but not limited to, cache memory, registers, and buffers. Data that populates memory 130 includes translation utility 135 and translation table 140. Translation utility 135 uses translation table 140 to determine where to route data packets back and forth between InfiniBand network 105 and Ethernet network 110 as illustrated in FIG. 3, which is described below. Exemplary translation tables 140 are illustrated in FIGS. 2A-2B, which are also described below. A subnet manager is used to generate the values within translation table 140 based on the configuration of network 100. The subnet manager may subsequently update translation table 140 as required (e.g., if a new device is added to network 100).

In one embodiment, translation utility 135 only utilizes translation table 140 to determine where to route data packets during cross-network transfers (i.e., InfiniBand-to-Ethernet or Ethernet-to-InfiniBand), thereby minimizing the use of processing resources during intra-network transfers (e.g., InfiniBand-to-InfiniBand or Ethernet-to-Ethernet). In an alternate embodiment, server 115 may instead be coupled to InfiniBand network 105. In another embodiment, IBOE switch 120 may be included in a computer server, such as server 115, within network 100.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

With reference now to FIG. 2A, there is depicted an exemplary translation table, according to a first embodiment of the present invention. As shown, translation table 140 (FIG. 1) includes multiple Ethernet MAC addresses 200 that correspond to devices, such as device1 160, and/or other nodes within Ethernet network 110. Similarly, translation table 140 includes multiple InfiniBand LIDs 205 that correspond to nodes, such as node1 150, and/or other devices within InfiniBand network 105. Translation table 140 thus includes M Ethernet MAC addresses 200 and N InfiniBand LIDs 205, where M and N are positive integers.

According to a first embodiment, translation table 140 is configured as an array that includes multiple pre-defined IBOE port numbers of IBOE switch 120. A cell in translation table 140 that corresponds to a match between an Ethernet MAC address and an InfiniBand LID includes an IBOE port number that is assigned to the Ethernet MAC address and the InfiniBand LID. Each and every Ethernet MAC address matches a single InfiniBand LID and a single IBOE port number. Therefore each row within the array contains multiple zeros and a single IBOE port number. For example, if server 115 may send data packets to the computer or device corresponding to InfiniBand LID 1 via Ethernet MAC address 1, then the cell in translation table 140 corresponding to InfiniBand LID 1 and Ethernet MAC address 1 includes an IBOE port number (e.g., IBOE port number 1) and the other cells in the row include zeros (i.e., values indicating no match). Similarly, if InfiniBand LID N corresponds to Ethernet MAC address 2, then the cell in translation table 140 corresponding to InfiniBand LID N and Ethernet MAC address 2 includes an IBOE port number (e.g., IBOE port number 2, because both device 1 160 and device 2 165 attach to the same port on IBOE switch 120) and the other cells in the row include zeros. The same IBOE port number may be contained in multiple entries of the table. If the device addressed by a row in table 140 is attached to the InfiniBand fabric, then the MAC address is set to zero in table 140.

In an alternate embodiment, translation table 140 may include values other than IBOE port numbers (e.g., "yes" and "no", or "match" and "no match"). In another embodiment, binary values (e.g., ones and zeros) may indicate matches between an Ethernet MAC address and an InfiniBand LID.

With reference now to FIG. 2B, there is depicted an exemplary translation table, according to a second embodiment of the present invention. As shown, translation table 140 (FIG. 1) includes multiple rows 210. Translation table 140 includes M Ethernet MAC addresses 215 that correspond to the addresses of Ethernet devices (e.g., device1 160) or computers within Ethernet network 110, where M is a positive integer. Similarly, translation table 140 includes N InfiniBand LIDs 220 that correspond to InfiniBand nodes (e.g., node 150) or computers within InfiniBand network 105, where N is a positive integer. Translation table 140 also includes X IBOE port numbers 225 that correspond to ports of IBOE switch 120 that devices are coupled to for communication purposes, where X is a positive integer. Translation table 140 thus includes M Ethernet MAC addresses 215 matched to N InfiniBand LIDs 220 and X IBOE port numbers 225. If the device addressed by a row in table 140 is attached to the InfiniBand fabric, then the MAC address is set to zero in table 140.

Turning now to FIG. 3, there is illustrated a high level logical flowchart of an exemplary method of providing a converged IBOE network, according to an embodiment of the invention. The process begins at block 300 in response to IBOE switch 120 (FIG. 1) receiving a data packet via I/O interface 145. At block 305, translation utility 135 determines whether or not the data packet was received from InfiniBand network 105. If the data packet was received from InfiniBand network 105 (i.e., the data packet is an InfiniBand data packet), translation utility 135 performs an InfiniBand cyclic redundancy check (CRC) check on the data packet, as depicted in block 310. Translation utility 135 looks up one of Ethernet MAC addresses 215 (FIG. 2B) that corresponds to the InfiniBand LID of the data packet using translation table 140, as shown in block 315.

At block 320, translation utility 135 determines whether or not the destination InfiniBand LID of the data packet corresponds to an Ethernet port. If the destination InfiniBand LID corresponds to an Ethernet port, translation utility 135 generates an Ethernet packet using the MAC address identified from translation table 140, translation utility 135 encapsulates the InfiniBand link layer packet in an Ethernet packet with the destination address of Ethernet device's MAC address and sends that packet out of the IBOE port number contained in the corresponding row of table 140, as depicted in block 325. The process subsequently proceeds to block 355. If the destination InfiniBand LID does not correspond to an Ethernet port, translation table 140 uses the destination InfiniBand LID to look up the IBOE port number from translation table 140, as shown in block 330, and the process subsequently proceeds to block 355.

If the data packet was not received from InfiniBand network 105 (i.e., the data packet is an Ethernet data packet received from Ethernet network 110), translation utility 135 performs an Ethernet CRC check on the data packet, as depicted in block 335. Translation utility 135 strips out (i.e., separates and/or removes) the Ethernet header from the data packet, as shown in block 340. Translation utility 135 performs an InfiniBand CRC check on the data packet, as depicted in block 345. Translation utility 135 looks up one of InfiniBand LIDs 220 (FIG. 2B) from translation table 140 that corresponds to the destination LID referenced in the data packet, and translation utility 135 calculates the appropriate outbound IBOE port number 225 (FIG. 2B) of the previously encapsulated IB link layer packet with respect to IBOE switch 120, as depicted in block 350. The process subsequently proceeds to block 355.

At block 355, translation utility 135 sends the updated data packet to the target destination in either InfiniBand network 105 (if the data packet originated in Ethernet network 110) or Ethernet network 110 (if the data packet originated in InfiniBand network 105), and the process terminates at block 360.

The present invention enables server 115 to send InfiniBand data packets over Ethernet network 110 and vice versa. IBOE switch 120 eliminates the need for servers, such as server 115, to include adapters for multiple network protocols (e.g., both InfiniBand and Ethernet cards) and thus reduces the number of cables connected to exemplary server 115. IBOE switch 120 also enables server 115 to include a single network fabric manager.

The present invention thus provides a converged IBOE network. IBOE switch 120 (FIG. 1) receives a data packet. If the data packet is received by IBOE switch 120 from Infini-Band network 105 (FIG. 1), translation utility 135 (FIG. 1) looks up an Ethernet MAC address corresponding to a destination LID of the packet in translation table 140 (FIG. 1). Translation utility 135 generates an Ethernet packet and encapsulates an InfiniBand link layer packet before sending the packet. If the data packet is received by IBOE switch 120 from Ethernet network 110 (FIG. 1), translation utility 135 removes the Ethernet header from the packet and looks up the destination MAC, LID and IBOE port number corresponding to the destination LID used in the packet. Translation utility 135 calculates an outbound port number and sends the packet.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 3) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer network switch with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer network switch, a method comprising:
  receiving a data packet;
  in response to a determination that a data packet is received by an InfiniBand over Ethernet (IBOE) switch from an InfiniBand network:
    looking up an Ethernet media access control (MAC) address that corresponds to an InfiniBand Local Identifier (LID) of said data packet in a translation table;
    generating an Ethernet packet corresponding to said data packet; and
    encapsulating an InfiniBand link layer packet in said Ethernet packet;
  in response to a determination that said data packet is received by said IBOE switch from an Ethernet network:
    performing an Ethernet cyclic redundancy check on said data packet;
    removing an Ethernet header from said data packet;
    performing an Infiniband cyclic redundancy check on said data packet;
    looking up an LID that corresponds to a MAC address of said Ethernet header in said translation table; and
    calculating an outbound port number for said data packet from said IBOE switch; and
  sending said data packet to a destination in said computer network.

2. The method of claim 1, wherein said translation table comprises:
  a plurality of Ethernet MAC addresses corresponding to devices in said Ethernet network;
  a plurality of InfiniBand LIDs corresponding to devices in said InfiniBand network;
  a plurality of port numbers of said IBOE switch; and
  wherein each of said Ethernet MAC addresses translates to one of said InfiniBand LIDs.

3. A computer network comprising:
  an Ethernet network;
  an InfiniBand network; and
  an InfiniBand over Ethernet (IBOE) switch coupled to both said Ethernet network and said InfiniBand network, wherein said IBOE switch includes:
    a processor unit;
    an Input/Output (I/O) interface coupled to said processor unit; and
    a memory coupled to said processor unit; and
    an executable utility within said memory, wherein said executable utility provides the functions of:
      in response to a determination that a data packet is received by an InfiniBand over Ethernet (IBOE) switch from an InfiniBand network:
        looking up an Ethernet media access control (MAC) address that corresponds to an InfiniBand Local Identifier (LID) of said data packet in a translation table;
        generating an Ethernet packet corresponding to said data packet; and
        encapsulating an InfiniBand link layer packet in said Ethernet packet;
      in response to a determination that said data packet is received by said IBOE switch from an Ethernet network:
        performing an Ethernet cyclic redundancy check on said data packet;
        removing an Ethernet header from said data packet;
        performing an Infiniband cyclic redundancy check on said data packet;
        looking up an LID that corresponds to a MAC address of said Ethernet header in said translation table; and
        calculating an outbound port number for said data packet from said IBOE switch; and
      sending said data packet to a destination in said computer network.

4. The computer network of claim 3, wherein said IBOE switch comprises the translation table which includes:
  a plurality of Ethernet MAC addresses corresponding to devices in said Ethernet network;
  a plurality of InfiniBand LIDs corresponding to devices in said InfiniBand network;
  a plurality of port numbers of said IBOE switch; and
  an identifier that matches each of said Ethernet MAC addresses to one of said InfiniBand LIDs.

5. A computer program product comprising:
  a non-transitory computer storage medium; and
  program code on said non-transitory computer storage medium that that when executed within a data processing device coupled within a computer network causes the device to perform the functions of:

in response to a determination that a data packet is received by an InfiniBand over Ethernet (IBOE) switch from an InfiniBand network:
looking up an Ethernet media access control (MAC) address that corresponds to an InfiniBand Local Identifier (LID) of said data packet in a translation table;
generating an Ethernet packet corresponding to said data packet; and encapsulating an InfiniBand link layer packet in said Ethernet packet;

in response to a determination that said data packet is received by said IBOE switch from an Ethernet network:
performing an Ethernet cyclic redundancy check on said data packet; removing an Ethernet header from said data packet;
performing an Infiniband cyclic redundancy check on said data packet;
looking up an LID that corresponds to a MAC address of said Ethernet header in said translation table; and calculating an outbound port number for said data packet from said IBOE switch; and
sending said data packet to a destination in said computer network.

6. The computer program product of claim 5, wherein said translation table comprises:
a plurality of Ethernet MAC addresses corresponding to devices in said Ethernet network;
a plurality of InfiniBand LIDs corresponding to devices in said InfiniBand network;
a plurality of port numbers of said IBOE switch; and
an identifier that matches each of said Ethernet MAC addresses to one of said InfiniBand LIDs.

* * * * *